J. O. BROWN.
HARVESTER.

No. 176,829.

2 Sheets—Sheet 1.

Patented May 2, 1876.

Witnesses:
Alex. Mahon
John G. Center

Inventor:
James O. Brown
by A. M. Smith
attorney

2 Sheets—Sheet 2.
J. O. BROWN.
HARVESTER.
No. 176,829. Patented May 2, 1876.
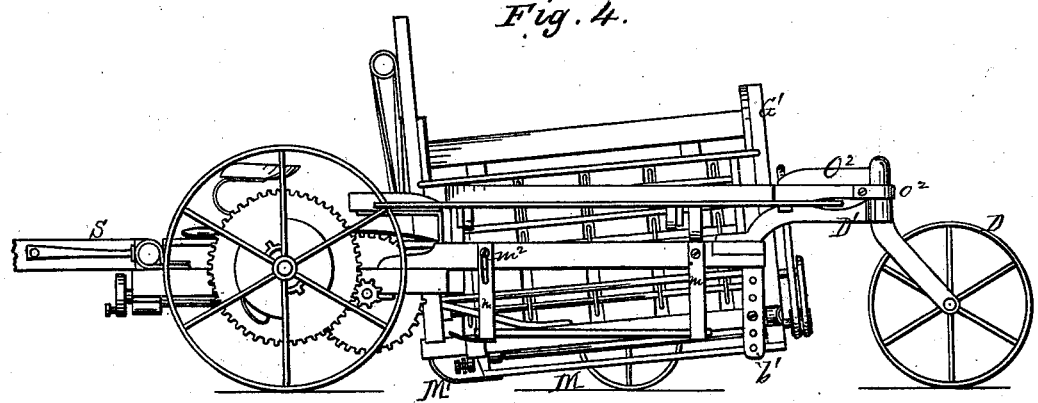
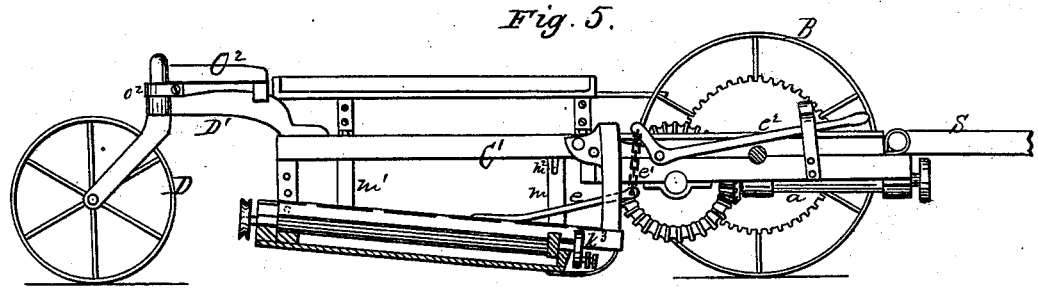
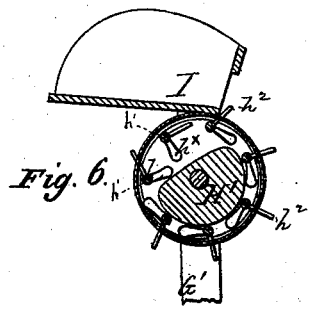
Witnesses:
Alex Mahow
John G. Center
Inventor:
James O. Brown
by S. M. Smith
Attorney

UNITED STATES PATENT OFFICE.

JAMES O. BROWN, OF MASSILLON, OHIO, ASSIGNOR OF TEN-TWELFTHS OF HIS RIGHT TO EDWIN BAYLISS, PLINY F. HODGES, AND FRANÇOIS T. LOMONT, OF SAME PLACE.

IMPROVEMENT IN HARVESTERS.

Specification forming part of Letters Patent No. 176,829, dated May 2, 1876; application filed August 9, 1875.

*To all whom it may concern:*

Be it known that I, JAMES O. BROWN, of Massillon, county of Stark and State of Ohio, have invented certain new and useful Improvements in Harvesters, of which the following is a full, clear, and exact description, reference being had to the accompanying drawings, making part of this specification in which—

Figure 1:
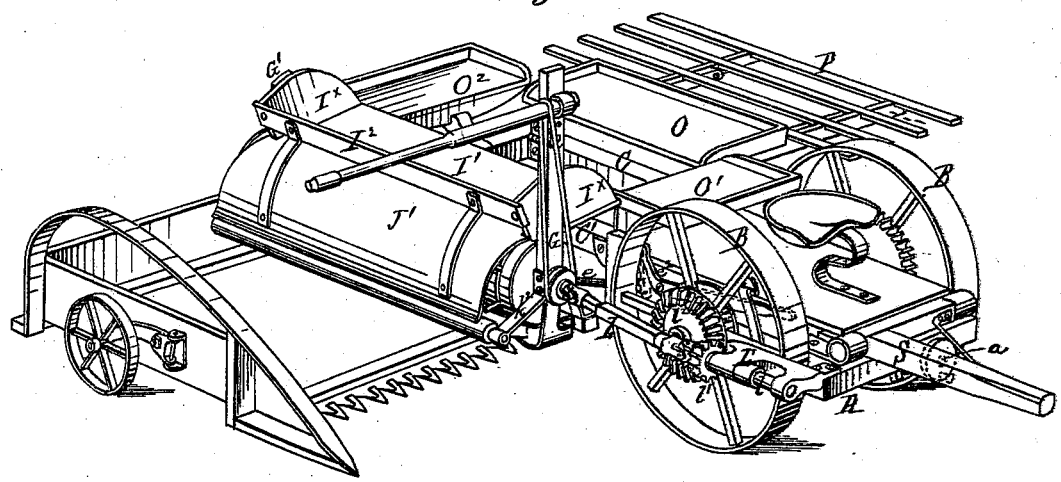
Figure 2:
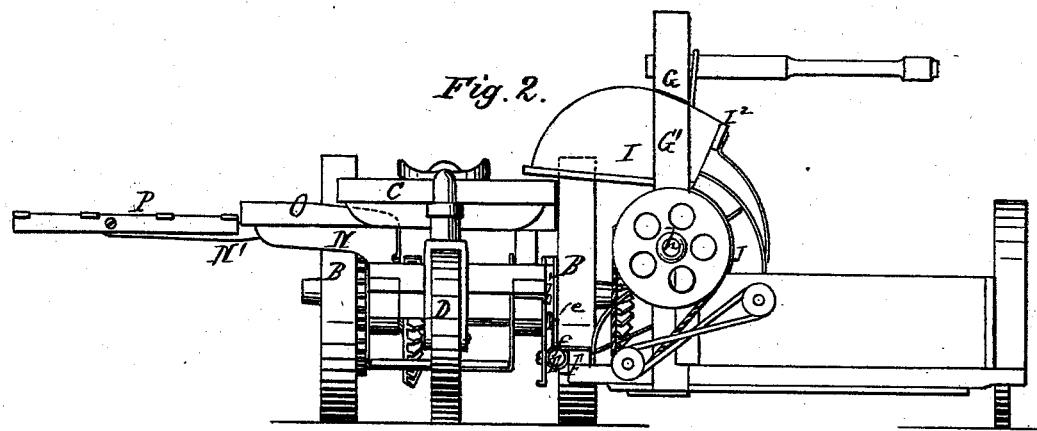
Figure 3:
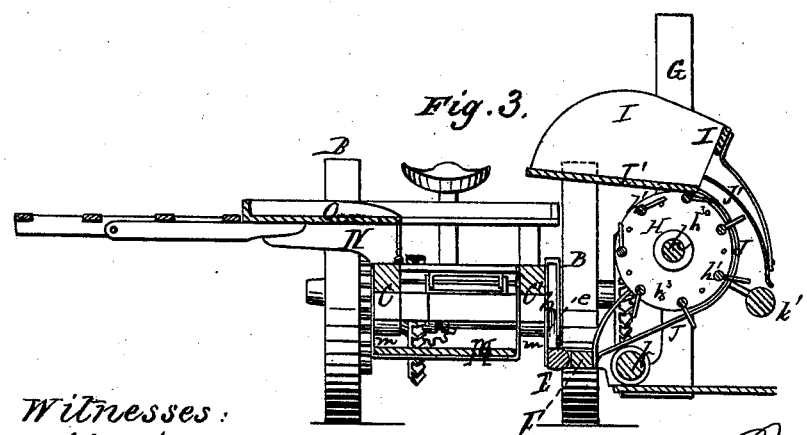

Figure 1 is a perspective view of my improved machine taken from the front, grain-side. Fig. 2 is a rear elevation of the same. Fig. 3 represents a vertical transverse section. Fig. 4 is a side elevation of the machine taken from the outer or stubble-side. Fig. 5 is a vertical longitudinal section through the same in line with the inner platform-apron roller and crank-shaft, and Fig. 6 shows in elevation the cam for actuating the retracting elevator-fingers.

Similar letters of reference denote corresponding parts of the machine wherever used.

My invention relates to a novel arrangement of removable secondary frame or binder's carriage in connection with the mowing-machine truck, and to the manner of combining the grain-platform, elevator, binders' grain-receptacle, stand, tables, and lifting apparatus therewith, whereby the grain-harvesting attachment, made complete in itself, is adapted to be readily applied to and used in connection with such mowing-machine truck, or to be removed therefrom when the machine is required for mowing, all as hereinafter explained.

In the accompanying drawings, A represents the mower-frame mounted upon two independent driving and carrying wheels, B B,' from which, through any suitable arrangement of gearing, motion is imparted to a crank-shaft, $a$, which drives the cutters when the machine is used as a mower. To the rear of the frame A, which, by preference, is made rectangular in form, is bolted (or it may be hinged thereto, if preferred) the forward end of a secondary rectangular frame, C, the rear end of which is supported by a caster-wheel D. The inner longitudinal bar C' of this secondary frame has pendent arms or brackets $b\ b'$ rigidly secured to it, the forward one, $b$, being made in the form of a pendent guiding and sustaining loop, and the rear one, $b'$, being provided with a series of perforations or bolt-holes for adjustably connecting a pivoted bar, E, with the frame C, a lever-arm, $e$, rigidly connected with said pivoted bar, passing through the guide-bracket $b$ for facilitating the adjustment of the forward end of bar E, and for preventing lateral movement of the bar, or strain upon its pivotal connection with pendant $b'$.

The forward end of the arm $e$ is connected by a cord or chain, $e^1$, with a lifting-lever, $e^2$, pivoted to the forward end of the bar C', for enabling the attendant, while the machine is in operation, to readily adjust the forward end of the bar E, and therewith the cutter-platform which is connected with it, as described.

The bar E has its ends rounded, as shown in Fig. 2, and forms one part of a long hinge, the other part of which is formed by the inner rigid sill or longitudinal bar F of the platform-frame, which has straps $f$ firmly bolted to it near its ends, said straps surrounding the rounded portions of bar E, and turning freely thereon.

By this arrangement the grain-platform, which may be of any usual construction, is adapted to freely follow the surface of the ground at its outer end independently of both the truck and secondary frames with which it is connected, while, at the same time, the height of cut and the inclination of the platform can be readily controlled by the attendant.

The platform-frame is provided at its inner end, in front and rear, with suitable standards, the front one of which, shown at G, may also constitute the reel-post, if desired, in suitable bearings, in which is mounted a longitudinal shaft, $h$, carrying disks or "spiders" H near the periphery, or in the outer ends of the arms of which are mounted a series of toothed rock-shafts, $h^1$, (see Figs. 3 and 6,) arranged in a circle, and forming the elevator drum or cylinder. The rock-shafts $h^1$ are provided at one end (or it may be at both) with crank-arms $h^x$, (see Fig. 6,) a spur or friction-roller upon each of which traverses a stationary cam, H', arranged at one end of the cylinder, and by means of which the teeth $h^2$ are thrown out into positions radial to the cylinder-shaft, or nearly so, or are permitted to drop back against stops $h^3$ for passing the grain-receiver I, as hereinafter explained. The receiver I is made triangular in form, open on its upper and stubble sides, and with its bottom $I^1$, at its grain-side edge, placed in close proximity with the path of the shafts $h$, and above the same, as shown in Figs. 3 and 6. The grain-side $I^2$, from the bottom board $I^1$ up, is open or slotted to receive the grain from the elevator, and from the edge of the bottom board $I^1$, at this point, a series of curved slats, J, extend outward and downward upon the grain-side of the elevating-cylinder, in close proximity with the path of the toothed rods $h^1$, and upon a curved line concentric therewith, or nearly so, until they reach a point underneath the cylinder, whence they diverge outwardly and downwardly, and are connected at their lower ends with the platform-sill F. The teeth $h^2$ are projected through between these slats, and picking up the grain from the platform apron or carrier, they elevate and deposit it in the receiver I, when they are withdrawn to pass by the latter, in a manner that will be readily understood. Outside of and above the slats J is a concave compressor, J', for holding the grain against the slats J while it is being elevated, said compressing device being held suspended from the side-board $I^2$ of the receiver by springs or straps, which allow it to yield to the varying bulk of the grain, while at the same time holding it always firmly to its work. This compressor may be made of slats, if preferred.

Motion is communicated by suitable gears, or by a belt from the shaft $h$, to the platform-apron roller $k$, and thence, by a crossed belt, to a feed-roller, $k^1$, mounted at its forward end in an angular bearing-bracket, $k^2$, and at its rear in a bearing in the rear fender-board of the platform, and the grain, passing under said roller, is carried by the platform-apron against the slats J, when it is picked up and elevated by the teeth $h^2$, as explained.

For driving the cylinder-shaft I, said shaft is connected at its forward end with the rear end of a tumbling extensible shaft, L, which, at its forward end, is connected with a longitudinal shaft, $l$, mounted in a bearing-bracket, L', attached to the inner front corner of the truck-frame A, and to which motion is imparted by a bevel-pinion, $l^1$, thereon, engaging with a bevel-wheel, $l^2$, on the inner end of the main drive-wheel axle. The forward end of the shaft of the apron-roller $k$ is provided with a crank-wrist, $k^3$, from which, through the usual pitman, motion is imparted to the reciprocating cutters. Thus, when the harvester attachment is applied to the mower-truck, it is supplied with its own independent driving mechanism, the mowing-machine mechanism being thrown out of action, and the cutting apparatus, platform-apron, and elevator are all operated through the single tumbling extensible shaft L, adapting the cutting apparatus and cutter-platform to be adjusted relatively to the truck and secondary frames, as explained.

The secondary frame C has pendent angular straps $m$ $m^1$ pivoted to it in front and rear, said straps forming a support for the binders' platform or stand M. located below the frame C and in rear of the truck-frame A. The forward straps $m$ are slotted at $m^2$ to permit the forward end of platform M to rise for passing over obstructions, and a curved guard or runner, M', is secured to the forward edge of said platform, adapting it to readily surmount obstacles in its path. The outside longitudinal bar of the secondary frame C has transverse bars or arms N hinged to it—one at the front and the other at the rear, and upon these is secured a binder's table, O, which, when not in use, may be folded with the arms N into a vertical position, for passing through gates, &c., and either directly to the outer ends of arms N, extended, or to supplemental bars N' connected therewith, or to the table O, is pivoted a dumping-tray or bundle-carrier, P, of any suitable construction, and which will also be folded up with the bars N when not in use. In front and rear of the frame C are arranged transverse tables $O^1$ $O^2$, the forward one, $O^1$, being supported by angular standards, which, at their lower ends, rest in perforations or sockets in the timbers of frame C, the table being made removable therewith.

The rear table $O^2$ has secured to it a loop or strap, $o^2$, which clasps the shank of the caster-wheel D, the table resting on the supporting-bracket D' of said caster; and, like table $O^1$, said table $O^2$ is made removable with, or separately from, the secondary frame C.

The grain-receiver I is secured, through the medium of its end-boards $I^x$, to the standards G G' on the platform-frame, and consequently moves with said platform-frame as the latter is adjusted, or follows the uneven surface of the ground over which it is drawn, the end-boards forming guards to prevent the grain from being scattered, and for keeping it in compact shape.

The grain-receiver or platform overhangs the inner longitudinal bar C' of the rear secondary frame, between the end-tables $O^1$ $O^2$.

Where the secondary frame C is rigidly bolted to the rear of truck, as explained, the pole or tongue S should be hinged to the truck, as shown, permitting the frames A and C to rest on the wheels B and D; but where the secondary frame is hinged to the mower-truck, as suggested, the connection of the pole with the truck should be rigid, and the secondary frame will be supported by its hinge-connection therewith, and by the caster D.

It will be seen from the foregoing description that the harvester attachment, while it is adapted to be readily connected with the mower-truck, has its connection therewith through the secondary frame C and tumbling extensible shaft L only, and that by simply removing the bolts or disconnecting the hinges uniting the secondary frame with the truck-frame the entire harvester attachment can be removed, leaving the truck free to be used in connection with its ordinary mower cutting apparatus applied in the usual way, and having its own independent driving mechanism, the harvester-gearing being thrown out of action by any convenient arrangement of shipping devices, or removed, as preferred. The independent mower and harvester gears will, of course, be differently speeded, according to the requirements of the work to be performed by them.

Such parts of the machine as are not particularly described may be constructed in any usual or perferred manner.

Certain features of arrangement of the slatted elevating surfaces, in connection with the elevating drum or cylinder, are embraced and claimed in other applications of even date herewith.

Having now described my invention, what I claim as new, and desire to secure by Letters Patent, is—

1. The removable secondary frame or binders' carriage attached at its forward end to the machine or truck-frame, and supported at its rear by the caster-wheel, as described, in combination with the hinged platform and elevator-frame, attached to, and made removable with, said binder-carriage, substantially as described.

2. The binders' stand, suspended within the removable secondary carriage, in combination with the platform and elevator frames hinged to said carriage, substantially as described.

3. The supporting-bar E, to which the grain-platform is hinged, pivoted adjustably in the hanger $b'$ at the rear of the secondary frame, for permitting the adjustment of the cutting apparatus and platform, as described.

4. The cutting-platform, hinged at the front and rear to the pivoted bar E, attached to the secondary frame, substantially as and for the purpose described.

5. The arm $e$, on the hinged bar E, passing through the slotted support $b$, in combination with the lifting-lever $e^2$, attached to the removable secondary frame C, as described.

6. The cutting or grain platform, with the horizontal grain-carrier, elevator, binders' grain-receptacle, and reel, all attached to said platform, and hinged to the pivoted bar on the removable secondary frame in rear of the truck-frame, as described.

7. The combination, with the horizontal carrier and the elevated grain-receptacle, of the revolving elevating-cylinder, provided with the retracting-fingers, adapted to pick up and elevate the grain, and to be withdrawn to release the grain and pass the grain-receptacle, as described.

JAMES O. BROWN.

Witnesses:
I. H. BROWN,
S. A. CONRAD.